K. SCHOU.
Surveying Instrument.
No. 47,906.
2 Sheets—Sheet 1.
Patented May 23, 1865.
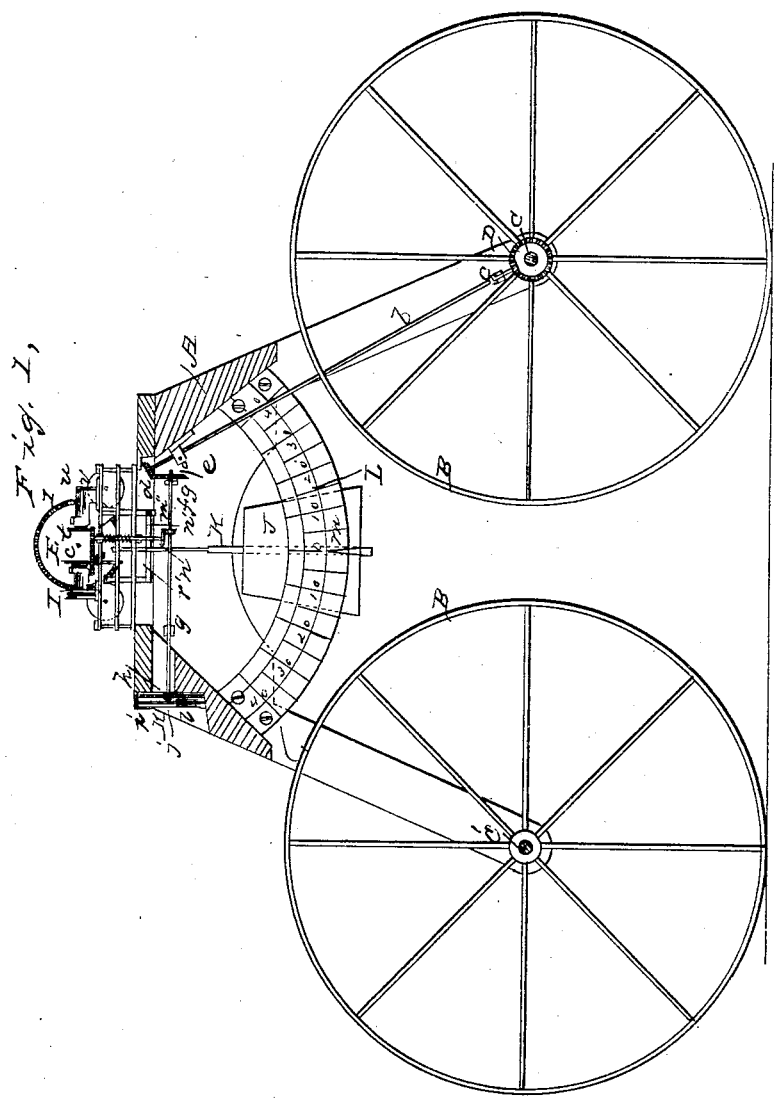
WITNESSES:
C. D. Smith
G. H. Hull
INVENTOR:
Karl Schou

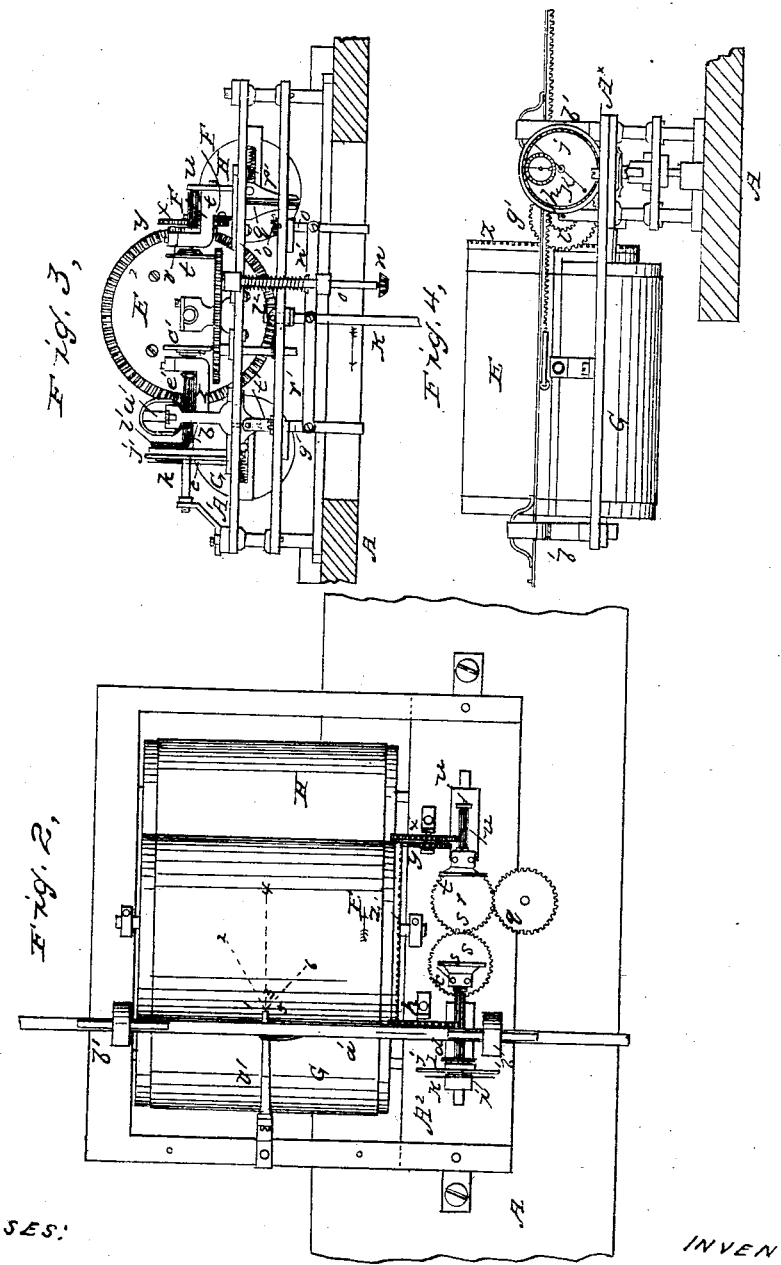

UNITED STATES PATENT OFFICE.

KARL SCHOU, OF LAFAYETTE, INDIANA, ASSIGNOR TO HIMSELF AND G. H. HULL, OF SAME PLACE.

IMPROVEMENT IN SURVEYING-INSTRUMENTS.

Specification forming part of Letters Patent No. 47,906, dated May 23, 1865.

*To all whom it may concern:*

Be it known that I, KARL SCHOU, of Lafayette, in the county of Tippecanoe and State of Indiana, have invented a new and Improved Surveying-Instrument; and I do hereby declare that the following is a full, clear, and exact description thereof, which will enable others skilled in the art to make and use the same, reference being had to the accompanying drawings, forming part of this specification, in which—

Figure 1 represents a side elevation of this invention, partly in section. Fig. 2 is a plan or top view of the recording and tracing mechanism in a larger scale than the previous figure. Fig. 3 is an end view of the same. Fig. 4 is a side elevation of the same.

Similar letters of reference indicate like parts.

This invention relates to a surveying-instrument which serves to record the distance between two or more points on the surface of the ground, and also to trace on a strip of paper the distance and the general formation of the ground between said points.

The motion of the mechanism for recording and tracing is derived from a wheel which is rolled over the ground and from a pendulum, the position of which indicates the inclination of the surface over which the instrument moves, and governs the motion of the pencil which serves to trace the formation of the ground, and also the speed of the roller carrying the slip of paper. Provision is also made to record the height of a hill or the depth of a declivity, and the mechanism used for this purpose is so arranged that by its aid the difference in the height of two distant points on the globe separated from each other by hills and declivities can be determined.

My instrument is constructed of a frame, A, made of wood or any other suitable material, and provided with legs which straddle the wheels B B' and form the bearings for the axles C C' of said wheels.

Secured to the hub of the wheel B is a cog-wheel, D, which gears into a small pinion, $a$, mounted on the lower end of an arbor, $b$, the bearings of which are in boxes $c$, one of which is secured to one of the legs of the frame A, and the other to the inner surface of said frame itself, as clearly shown in Fig. 1 of the drawings. Said arbor bears on its upper end a pinion, $d$, which gears in a bevel-wheel, $e$, mounted on one end of a horizontal shaft, $f$, which has its bearings in boxes $g$, secured to the inner surface of the frame A. On the opposite end of the shaft $f$ is mounted a pinion, $h$, which gears in a cog-wheel, $i$, secured to the inner end of an arbor, $j$, that has its bearing in a dial-plate, $k$, and bears on its outer end an index, $l$. The dial-plate $k$ is marked with a suitable scale and figures, and the gear which serves to impart motion to the index $l$ and the scale on the dial-plate $k$ are so adjusted that each mark on the same corresponds to the distance of one foot traveled over by the driving-wheel B. The motion of the cog-wheel $i$ is transmitted by a suitable tooth and pinion to a secondary index, moving on a small dial-plate under the index $l$, and this second index may be used to show the hundreds if the first index shows the units and tens, or the motion of the two indices may be arranged for any other desirable proportion.

The motion of the shaft $f$ is transmitted to the tracing and recording mechanism by wheels $m$ $m^*$ $n$, the first one of which is secured to the shaft $f$ and the last to a vertical arbor, $o$, whereas the second or intermediate wheel, $m^*$, is mounted on a short arbor running in suitable bearings attached to the frame A. The arbor $o$ has its bearings in lugs projecting from the edges of the top and bottom plates, $p$ $p^*$, of the frame $A^*$, which supports the recording and tracing mechanism. A cog-wheel, $q$, mounted on the upper end of the shaft $o$, gears in a similar cog-wheel, $r$, on a short vertical arbor, which has its bearing in the upper and middle plate of the frame $A^*$, and from which motion is transmitted to another vertical shaft by means of a cog-wheel, $s$, gearing in the cog-wheel $r$, as shown particularly in Fig. 2 of the drawing. The wheel $r$ serves to impart motion to the paper-cylinder E, and the wheel, $s$, to the mechanism for recording and tracing the formation of the ground. For the purpose of transmitting motion from the wheel $r$ to the paper-cylinder, a friction-disk, $t$, is employed, which is secured to the end of an arbor, $u$, that has its bearings in standards $v$, raising from a carriage, F, which slides back and forth in a slot in the top plate of the frame $A^*$. The friction-disk is compressed upon the surface of the wheel $r$ by a spring in the interior of the bearing next to said wheel, and the motion imparted to the friction-disk by the wheel $r$ is transmitted to the paper-cylinder by a pinion, $w$, and cog-wheel, $x\ y$, the latter one of which gears in a toothed-rim, $z$, on the end of the paper-cylinder. The strip of paper is drawn from a roller, G, over the paper-cylinder and wound up on a roller, H, and the paper-cylinder rests upon said rollers by friction, so that its motion is communicated to the same. By this arrangement the strip of paper is always kept taut and in the proper position for the tracing-instrument. The tracing-instrument is secured to a toothed rack, $a'$, which slides back and forth in standards $b'$ rising from the frame A*, and said tracing-instrument consists of a simple piece of lead inserted in a tube which is attached to the toothed rack and pressed toward the paper by a spring, as shown in Fig 2. Suitable spring-clasps hold the rack down in its seat. Said toothed rack receives a motion parallel to the axis of the paper-cylinder by means of a friction-disk, $c'$, which is mounted on the end of an arbor, $d'$, and pressed down upon the surface of the wheel $s$ by means of a spring inserted in the inner bearing of said arbor. The bearings of the arbor $d'$ are in standards $e'$, rising from a carriage, I, which slides back and forth in a slot in the top plate of the frame A*. A pinion, $f'$, secured to this arbor, gears in a cog-wheel, $g'$, on an arbor, $h'$, which also bears a cog-wheel, $i'$, that gears in the toothed rack $a'$, as shown more particularly in Fig. 4. The outer end of the arbor $d'$ extends through a dial-plate, $j'$, and it bears an index, $k'$, which is intended to show by a suitable scale on the dial the number of feet contained in elevations or depressions over which the instrument is drawn. A secondary index, moving under the index $k'$ on a secondary dial, shows the hundreds or any other proportion, and it is set in motion by a tooth projecting from the arbor $d'$ and catching once at every revolution of said arbor in the teeth of a cog-wheel, $l$, mounted on the inner end of the arbor which carries the secondary index. If the instrument runs on level ground the friction-disk $c'$ stands exactly over the center of the wheel $s$ and the arbor $d'$ remains stationary. In that case the pencil traces a right line at right angles to the axis of the upper cylinder. At the same time the friction-disk $t$ stands near the periphery of the wheel $r$ and imparts to the paper-cylinder a certain velocity, which may be termed the "normal" velocity thereof, and the pencil traces a line on the paper equal in proportion to the distance over which the instrument has been drawn. During this time the index $k'$ remains stationary, but the index $l$, on the end of the main frame A, records the distance over which the instrument has been drawn. If the instrument runs up or down on the side of a hill, the position of the carriages F and I is changed automatically by the action of a weight, J, which is suspended from a rod, K. Through the upper end of this rod passes a pin, $l^2$, which rests in suitabl semicircular bearings attached to the middle plate of the frame A*, as clearly shown in Fig. 3. Said rod is thus free to oscillate back and forth according to the position of the instrument on level ground or on a grade. In order to show the number of degrees of the grade, the weight J is provided with an index, $m$, that points on a scale marked on an arc, L, which is secured to the lower part of the frame A, as shown in Fig. 1. The rod K connects by a link, $n'$, with one arm of an elbow-lever, $o'\ o^*$, the fulcrum-pin of which has its bearings in forked seats secured to the middle plate of the frame A*, and the other arm, $o^*$, of said elbow-lever carries a pin, $p$, which catches into a slotted arm, $q'$, extending down from the carriage F. If the instrument runs on level ground, the arm $o^*$ of the elbow-lever $o'\ o^*$ stands in a horizontal position, and the carriage F is so adjusted that in this case the disk $t$ bears on the surface of the cog-wheel $r$ near to its periphery, imparting to the paper-cylinder what I term the "normal" velocity. If the instrument runs on a grade either up or down, the arm $o^*$ of the elbow-lever is thrown out of its horizontal position, and the carriage is moved toward the center of the wheel $r$, and the disk $t$ is made to bear on the circumference of a smaller circle than it does when the instrument runs on level ground; consequently the velocity of said disk and the velocity of the paper-cylinder will be retarded. This retardation will be in proportion to the grade. If the grade is steep, it will be greater than if the grade is low, and the motion of the carriage toward and from the center of the wheel $r$ is so graduated that when the instrument is drawn over a hill the velocity of the paper-cylinder corresponds to the base-line of said hill, or, in other words, the strip of paper advances precisely over the same distances over which it would advance if the instrument would be drawn over the base-line of the hill. The rod K also connects by a link, $r'$, with a lever, $s'$ which has its fulcrum on a pivot, $t'$, the bearings of which are in forked boxes attached to the middle plate of the frame A.* The upper end of said lever, $s'$, is armed with a pin which catches in a slotted arm, $t^2$, extending downward from the carriage I. By imparting to the lever $s'$ an oscillating motion, therefore, the carriage I is made to move back and forth similar to the carriage F, but there is this difference that an oscillating motion of the rod K, in either direction produces a motion of the carriage toward the center of the wheel $r$, whereas the carriage I is made to move in a direction contrary to that in which the rod K swings— that is to say, in the direction of the arrow marked near it in Fig. 3, the carriage I moves in the opposite direction if said rod swings, and vice versa. When the instrument runs on level ground, the disk $c'$ stands right in the center of the wheel $s$ and it remains stationary; but if the instrument is drawn along on a downward grade, the carriage I moves in the direction of the arrow marked on it in Fig. 3, and the disk $c'$, being curved inside the center of the wheel $s$, is rotated, so that the toothed rack $a'$ moves in the direction of the arrow marked on it in Fig. 2, and the pencil which is attached to said toothed rack will follow the oblique lines 1 2, or any other oblique line deviating from the base-line 3 4. If the instrument moves on an ascending grade, the disk $c'$ is moved out of the center of the wheel $s$ and the rock $a'$ is caused to move in a direction opposite the arrow marked on it, and the pencil follows the oblique line 5 6, or any other oblique line deviating from the base-line in the same direction. The angles between the lines 1 2 or 5 6 and the base-line depend upon the relative speed of the paper-cylinder and that of the traversing motion of the toothed rack. If the speed of this latter motion increases in proportion to the speed of the paper-cylinder, the angles between the lines 1 2 or 5 6 and the base-line will increase, and vice versa, and by the motion of the disk $c'$ toward and from the center of the wheel $s$ the traversing speed of the toothed rack is rendered self-adjusting, and will accommodate itself to the variable speed of the paper-cylinder, which also adjusts itself automatically according to the grade on which the instrument moves, as previously described. By this arrangement a correct profile of the surface over which the instrument moves is drawn on the strip of paper stretched on the paper-cylinder. At the same time the height of a hill or depth of a valley is indicated by the index $k'$, which turns backward or forward or remains stationary according to the formation of the ground over which the instrument is drawn, and after the instrument has been drawn over a certain distance the index $k'$ will show the difference in the height of the starting-point and of the terminus of the route over which the instrument has moved. By this arrangement I am enabled in a simple and easy manner to produce an outline of the profile of a certain tract of land and also record the distance of any two points on the earth which are so situated that the instrument can be drawn from one to the other.

If desired, the instrument can be used for measuring the distance only, without using the tracing and recording mechanism attached to the frame $A^*$ simply by raising the arbor $o$, which throws the pinion $n$ out of gear with the wheel $m^*$.

For the purpose of tracing the base-line on the paper, a pencil-tube, $v'$, is secured to the frame $A^*$, different holes being provided to adjust said tube in the center or near the ends of the paper-cylinder, according to the formation of the ground over which the instrument is to be drawn. A pencil inserted into this tube is not influenced by the formation of the ground, and draws the base-line, while the movable pencil traces the profile of the ground.

I claim as new and desire to secure by Letters Patent—

1. A surveying-instrument provided with a wheel, B, index $l$, paper-cylinder E, and tracing device or pencil, substantially in the manner and for the purpose set forth.

2. The method herein described of adjusting the speed of the paper-cylinder according to the grade or formation of the ground over which the instrument is drawn, consisting of the pendulum-weight J, carriage F, friction-disk $t$, wheel $r$, and cog-wheels $a\ y\ z$, or any equivalent means.

3. The method of regulating the motion of the pencil or tracing mechanism according to the formation of the ground, substantially as herein set forth, consisting of the wheel $s$, friction-disk $c'$, pinion $f'$, cog-wheels $g'\ i'$, and toothed rack $a'$, or any other equivalent means.

4. The combination of the pendulum-weight J, carriages I F, cog-wheels $s\ r$, friction-disks $c'\ t$, paper-cylinder E, rack $a'$, with tracing-device and index $k'$, all constructed and operating substantially as and for the purpose set forth.

5. The elbow-lever $o'\ o^*$, in combination with the pendulum-weight J and carriage F, applied substantially as set forth, so that a motion of the pendulum-weight in either direction causes the carriage to move toward the center of the wheel $r$.

KARL SCHOU.

Witnesses:
M. M. LIVINGSTON,
E. L. TOPLIFF.